Patented Aug. 29, 1933

1,924,743

UNITED STATES PATENT OFFICE 1,924,743

PROCESS OF PREPARING REFRACTORY MATERIAL

Elisabeth Lux, Essen, Germany, assignor, by mesne assignments, to The Koppers Company of Delaware, Pittsburgh, Pa., a corporation of Delaware No Drawing. Application October 7, 1930
Serial No. 487,091

8 Claims. (Cl. 106—10)

The present invention relates to a process of preparing refractory material, and has particular reference to a method of preparing said refractory material from granular inert substances and ground dry clay, the process being so carried out that the inert material is primarily treated with a deflocculating agent and water, and then the clay is added. Furthermore the process is so carried out that the amount of water used is such a quantity, that after mixing the clay and the inert substance, a dehydrating step is not necessary, but on the other hand, the mass may be molded immediately.

It is known in connection with the preparation of ceramic masses from grog or refractory material and clay, that a long soaking and aging is necessary in order to effect a homogeneous plasticity of the mass, a satisfactory adhesiveness and a good coating of each particle with clay.

It has now been shown that one can obtain a much greater efficiency and also at the same time the process is greatly accelerated, if one saturates the grog before the addition of clay, not only with water as has already been proposed, but if, for the purpose of wetting the grog particles, one adds, besides the water, electrolytes or other substances which exert a deflocculating effect on the clay added after the wetting of the grog particles, which increase the adhesiveness of the clay about the said particles.

As such substances, there come first into consideration those known substances which have been used in preparing defloculated slips, such as sodium carbonate, silicate or hydroxide, tannins, humic substances or also others, as for example the liquor from the sulphite process of paper manufacture or ammonia, and these may be used alone or in suitable combination.

Of course, these substances must be adapted to the clay used, as different clays require different deflocculating material.

The amount of water is so regulated that after the addition of the clay, a readily moldable mass results immediately, and this amount of water is large or small according to the kind of molding, i. e. pressing, stamping, soft forming, etc. On the other hand, the amount of water in proportion to the amount of added clay is not of prime importance, for it is in nowise essential to the process that the total amount of clay be converted into a liquid, but it is essential that the outer surfaces of the particles of grog be so previously prepared that the clay firmly adheres to each particle and that it easily and quickly covers them with a film. This covering is accomplished by any mixing operation in which a slight frictional contact of the granular particles with the clay particles occurs, no additional pressure or kneading being necessary.

The process can be used on granular refractory masses of any kind, such as burnt clay, quartzite, sillimanite, cyanite, mullite, corrundum, silicon carbide, etc., which may, by means of clay, be formed into bricks or the like. The amount of clay is not limited, for one can use according to the process, for example a minimum of 1% and as high as 50% by weight. The clay is preferably finely divided before using.

I give below several examples of how the process may be carried out.

350 kilos of burnt clay of particles not exceeding 4 mm in size to which 150 grams sodium carbonate, 100 grams sodium silicate and 30 liters water are added, are mixed in a trough mixer of the Cincinatus or in a Mastodon mixer type. After the water has been added, the mixing is continued for 3 minutes, then 150 kilos of dry clay, ground to a maximum grain size of 1 mm are added and the batch is then mixed, at room temperature, for 3–5 minutes. The mass is then in a semi-dry condition ready to be pressed.

After being ground to a maximum grain size of 5 mm, 500 kilos of calcined cyanite are mixed in a trough mixer together with 50 grams of sodium carbonate, 500 grams of humic acid, 1½ liters of an ammonia 25% solution and 33 liters of water. After mixing for 5 minutes, 12½ kilos of "ball" clay are added and the mixing is again proceeded with for 5 minutes. After this mixing has thus been effected the mass may be at once stamped.

300 kilos of corrundum, the grain size not exceeding 2 mm, are mixed with 1½ liters sulphite liquor, 3 liters of 25% ammonia solution and 41.5 liters of water. After mixing the ingredients for 3 minutes, 75 kilos of dry clay are added in 2—2 portions and the mixing continued for further 10 minutes.

During this time, the state of best plasticity may be secured by adding a little more water, to adjust the water-content.

Then the mixture may be moulded in plastic condition.

It has been proposed previously in connection with the preparation of ceramic masses, especially molded or pressed masses, to add the clay in the form of a deflocculated slip whereby a similar effect can be obtained as by the foregoing process. However there results the very important disadvantage that one uses an agitating apparatus for decomposing the clay, and also the water content of a so prepared mass is to be considered in accordance with the clay content and not with the water required in the molding process. Such a process is therefore unsuitable and undesirable if the clay content exceeds a maximum of perhaps 10%, because then a drying of the mass before molding is necessary.

Furthermore, it has already been proposed in connection with the preparation of ceramic plastic masses to add to the said mass itself, electrolytes for increasing its binding properties and hardening in the dry condition.

However, it has now been shown that the present process is superior to known processes since the coating of the articles with clay by adding electrolytes does not proceed as quickly and as uniformly as when the particles of refractory material are previously saturated with a solution of such a material prior to the incorporation of the clay.

It is to be distinctly understood that my process is not limited to the specific details disclosed above and I claim as part of my invention all modifications which may reasonably fall within the scope of the appended claims.

I claim:

1. The process of preparing ceramic masses from granular refractory material and finely divided dry clay, which comprises soaking the said refractory material in water containing a deflocculating substance, mixing the thus treated refractory material with clay in a suitable mixer and then molding the same.

2. The process as set forth in claim 1 in which the deflocculating substance is one selected from the group consisting of sodium carbonate, silicate and hydroxide tannins, humic substances, sulphite liquor and ammonia.

3. The process as set forth in claim 1 in which the refractory material is one selected from the group consisting of burnt clay, quartzite, sillimanite, cyanite, mullite, corrundum and silicon carbide, and in which the deflocculating substance is at least one of the group consisting of sodium carbonate, silicate or hydroxide, tannins, humic substances sulphite liquor and ammonia.

4. A process as set forth in claim 1 in which the amount of clay used is from 1 to 50% by weight of the total mass.

5. A process as set forth in claim 1 in which the amount of clay used is from 1 to 50% by weight of the total mass and in which the deflocculating substance is at least one of the group consisting of sodium carbonate, silicate and hydroxide, water glass, tannins, humic substances, sulphite liquor and ammonia.

6. A process as set forth in claim 1 in which the water content of the refractory-clay mixture is such that the said mixture may be molded without drying the same.

7. A process of preparing ceramic masses which comprises soaking a granular refractory mass having a particle size of not more than 4 mm in a solution of sodium carbonate, sodium silicate, and water, adding clay of a particle size of not more than 1 mm., mixing it thoroughly and then molding the same.

8. A process as set forth in claim 1 in which the granular refractory material is soaked for a period of a few minutes prior to the addition of the clay.

ELISABETH LUX.